United States Patent [19]

Panzica

[11] Patent Number: 4,836,158
[45] Date of Patent: Jun. 6, 1989

[54] MOTORCYCLE GASKET AND ASSEMBLY

[75] Inventor: Ignatius J. Panzica, Morgan Hill, Calif.

[73] Assignee: Custom Chrome, Inc., Morgan Hill, Calif.

[21] Appl. No.: 174,506

[22] Filed: Mar. 28, 1988

[51] Int. Cl.$^4$ .................................................. F02F 1/00
[52] U.S. Cl. .......................... 123/193 CH; 277/235 B
[58] Field of Search ............ 123/193 CH; 277/235 B, 277/235 R, 205, 206 R

[56] References Cited

U.S. PATENT DOCUMENTS

| | | | |
|---|---|---|---|
| 4,325,559 | 4/1982 | Czernik et al. | 277/235 B |
| 4,333,975 | 6/1982 | Booth | 277/235 B |
| 4,387,904 | 6/1983 | Nicholson | 277/235 B |
| 4,676,515 | 6/1987 | Cobb | 277/235 B |
| 4,704,998 | 11/1987 | Kojima | 277/206 R |
| 4,746,130 | 5/1988 | Abele | 277/235 R |
| 4,754,982 | 7/1988 | Udagawa et al. | 277/235 B |
| 4,765,634 | 8/1988 | Kobayashi et al. | 277/235 B |

*Primary Examiner*—E. Rollins Cross
*Attorney, Agent, or Firm*—William W. Haefliger

[57] ABSTRACT

A composite gasket is employed between a Harley Davidson engine cylinder block and head; the gasket includes a malleable metal annulus about the cylinder bore, and a non-metallic sheet gasket about the metal annulus and free of overlapping connection to the metal annulus; and a malleable metal gasket is usable between the block and crank case, with one bolt causing clamping of both metal gaskets so that the non-metallic gasket sheet is non-destructively clamped to seal about fluid passages.

17 Claims, 2 Drawing Sheets

4,836,158

MOTORCYCLE GASKET AND ASSEMBLY

BACKGROUND OF THE INVENTION

This invention relates generally to gaskets and more particularly to head and base gaskets as used in Harley Davidson motorcycle engines.

There is need for reliable, highly protective and self-adjustable gaskets, gasket assemblies, metal and non-metal gasket combinations, and gasket and head, cylinder block and crank-case assemblies, as are disclosed herein. Such structures are needed to minimize or prevent gasket blow-outs, deterioration, and to optimize reliability and self-adjustability of gaskets, as will appear.

SUMMARY OF THE INVENTION

It is a major object of the invention to provide gasket structures and assemblies meeting the above needs.

It is another object to provide an improved composite gasket between block and head, said composite gasket including a metal annulus extending about the cylinder bore and exposed to said bore, and a non-metallic sheet gasket extending about the metal annulus.

It is a further object to provide a metal annulus and a surrounding non-metallic sheet gasket, wherein these elements define a generally cylindrical interface therebetween, the metal annulus and non-metallic sheet gasket sized for use on a Harley Davidson motorcycle engine. Further, these elements are free of direct interconnection at said interface, the metal annulus including malleable metal surface contact with at least one of the head and block. The malleable metal preferably consists of copper, having surface contact with both the head and block, at opposite sides of the metal annulus.

It is yet another object of the invention to provide a multiple gasket assembly together with the Harley Davidson motorcycle cylinder block, head and crank-case, wherein:

(a) a thin metal sheet gasket is between the block and case, (b) a thin composite gasket is between block and head, said composite gasket including a metal annulus extending about the cylinder bore and exposed to said bore, and a non-metallic sheet gasket extending about the metal annulus, (c) and bolt means clamps the head and case to the block creating compression loading transmitted by the metal sheet gasket and by the metal annulus, the non-metallic sheet gasket also clamped to seal off about passages for fluid flow in the head and block.

These and other objects and advantages of the invention, as well as the details of an illustrative embodiment, will be more fully understood from the following specification and drawings, in which:

DRAWING DESCRIPTION

DETAILED DESCRIPTION

Figure 1:
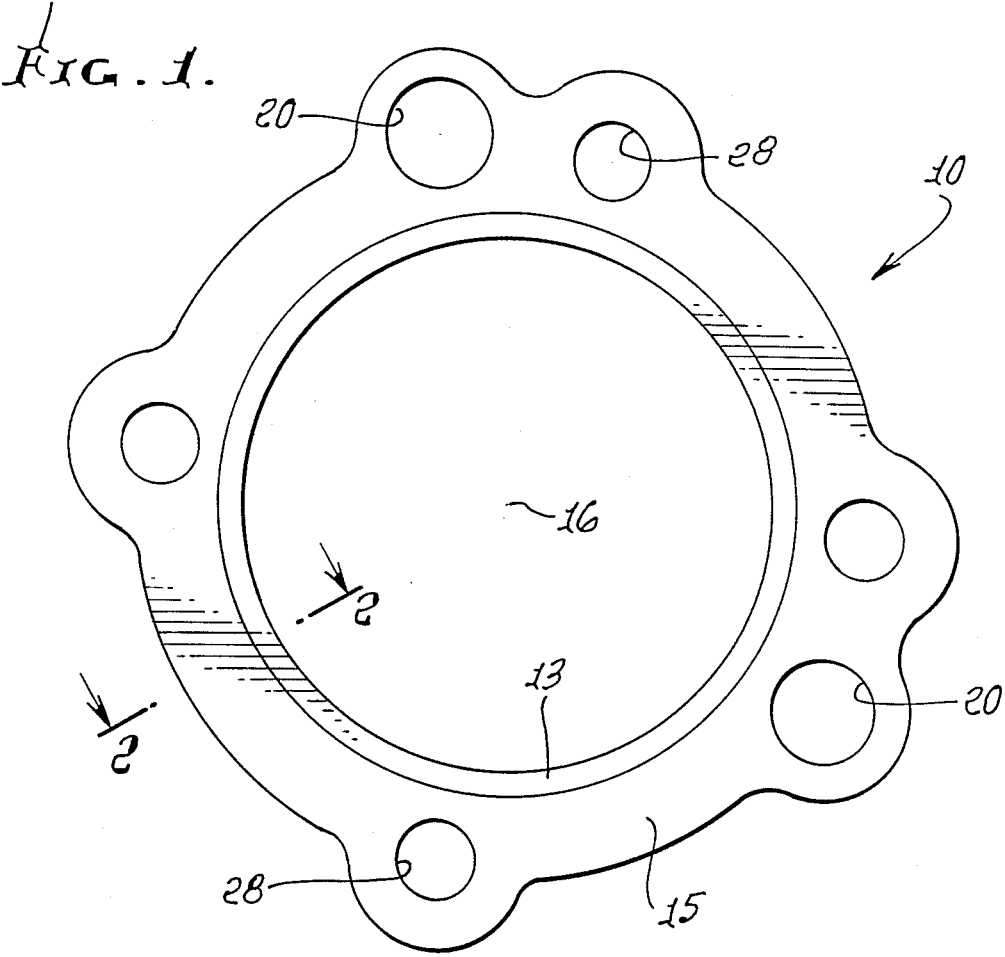
FIG. 1 is a plan view of a gasket assembly embodying the invention.
Figure 2:
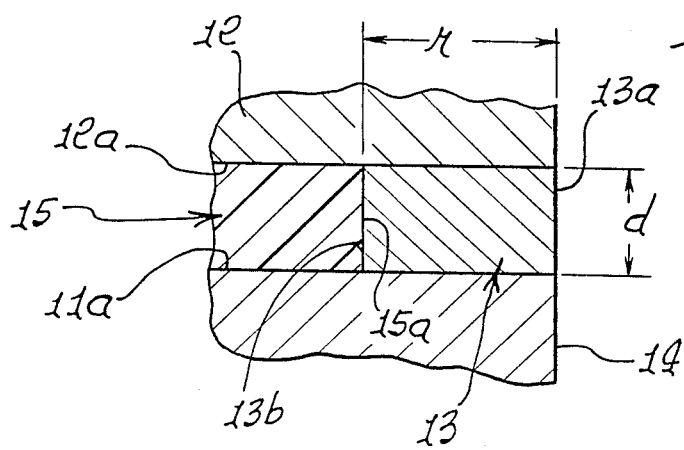
FIG. 2 is an enlarged, fragmentary cross-section on lines 2—2 of FIG. 1.
Figure 3:
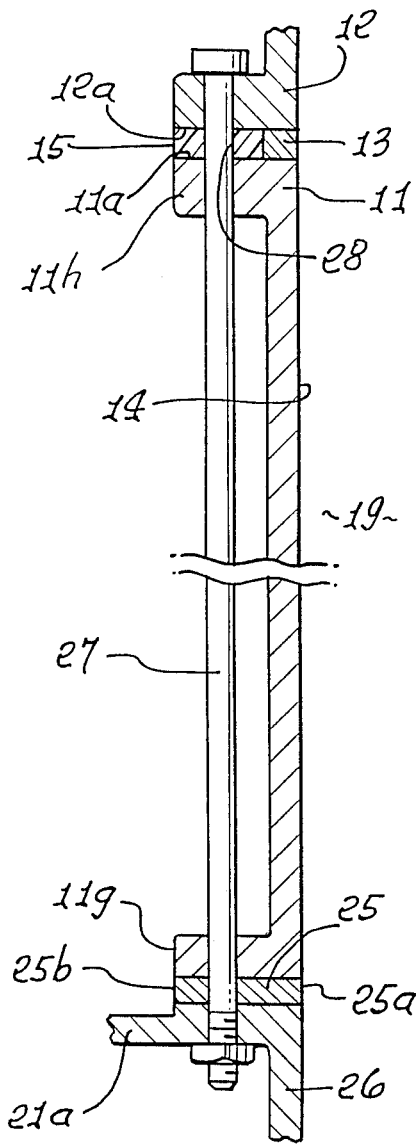
FIG. 3 is a fragmentary vertical section taken through an engine and illustrating the invention.

FIGS. 1-3 show a thin, composite head gasket 10 or gasket assembly used between the cylinder block 11 and head 12 of a Harley Davidson motorcycle engine. The gasket assembly includes a metal annulus 13 formed to extend about a cylinder bore 14 at the top side 11a of the block. The annulus defines a bore 13a that is substantially co-terminous with bore 14, i.e. each has the same diameter. For example, that diameter may be about 3.70 inches.

Metal annulus 13 has a substantially cylindrical outer side 13b that engages the bore 15a of a non-metallic sheet gasket 15 extending about metal gasket 13. The two gaskets are not connected at 15a and 13b, but are initially mutually centering about a common axis 16 (the axis of the cylinder bore), so that they can independently adjust to clamping loading exerted by the underside 12a of the metallic head, and the upper side 11a of the cylinder block. Those sides are parallel, as seen in FIG. 2, for carrying out their different functions to best advantage. In this regard, the principle functions of metal gasket 13 are:

(a) to transmit the compression loading between 11 and 12, while compressing sufficiently to allow some compression loading upon non-metallic gasket 15. (The thickness of metal gasket 13 is indicated at "d", and it resiliently compresses by amount $\Delta d$, under such compression loading), (b) to block access of hot combustion gases in piston chamber 16 to the non-metallic gasket 15, thereby protecting it against degradation and blow-out.

The principle functions of non-metallic gasket 15 are:

(c) to be controllably (but not destructively) compressed to a thickness equal to the compressed thickness $d - \Delta d$ of gasket 13, (d) to seal-off about fluid passages as at 20 that communicate fluid such as oil or water in and between the block and head, such sealing pressure being controlled by the compression $\Delta d$ of the metal gasket, (e) to provide compression sealing at the interface 15a and 13b due to expansion of metal wall 13b toward non-metal wall 15a under compression $\Delta d$ of gasket 13.

Figure 4:
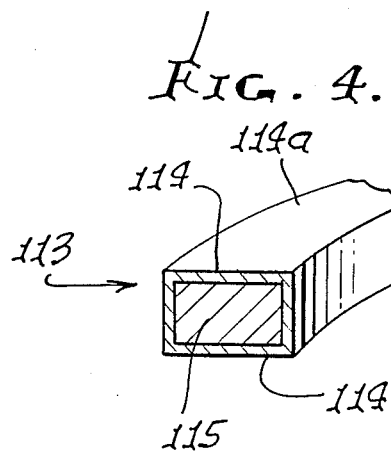
FIG. 4 is a cross-section showing an alternate metal gasket structure.

Gasket 13 consists of malleable metal or metal alloy, the preferred material being copper. FIG. 4 shows an alternate configuration, the metal gasket annulus 113 consisting of a copper coating 114 on and about an annular core 115 of ferrous material such as steel. That coating can be deposited electrolytically, or otherwise. Copper surfaces 114a and 114b engage surfaces 12a and 11a, to sealingly conform to their shapes.

Figure 5:
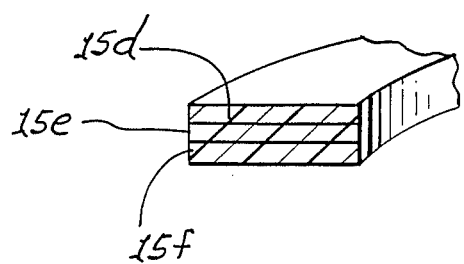
FIG. 5 is a cross section showing sandwich form non-metallic gasket structure.

The non-metallic, fire resistant flexible gasket 15 may for example consist of expanded graphite, sold under the tradename KLINGERITE. Other materials include silicon, and silicon derivatives. Gasket 15 may be of homogeneous form, or in layers or sandwich form, as indicated at 15 d, e and f in FIG. 5. Dimension "d" is about 0.060 inches, for example, and dimension "r" is about 0.120 inches.

FIG. 3 also shows a metal sheet gasket 25 compressed and sealing off between the metallic block 11 and metallic crank case 26. An elongated tension bolt 27 extends through the case flange 21a, gasket 25, block flanges 11g and 11h, openings 28 in gasket 15, and head 12. A series of such bolts 27 may be provided to clamp the gaskets 25, 13 and 15, simultaneously, which allows simultaneous individual adjustment of all three gaskets to compression loading thereon. Gasket 25 desirably consists of malleable material such as copper; and its overall radial dimension between its bore 25a and outer surface 25b is about the same as the overall radial dimension of both gaskets 13 and 15. The thickness of gasket 25 is about 0.010 to 0.030 inch; and the plan view shape of gasket 25 may be the same as that of gaskets 13 and 15, as seen in FIG. 1, except that oil and water passages 20 are not provided.

The head, block and case may consist essentially of aluminum.

I claim:

1. In combination with an internal combustion engine cylinder block, head and case, the block located between the head and case, there being passages in the block and head to pass fluid therebetween, outwardly of a cylinder bore, an improved sealing system comprising
   (a) a thin metal sheet gasket between the block and case,
   (b) a thin composite gasket between block and head, said composite gasket including a metal annulus extending about the cylinder bore and exposed to said bore, and a non-metallic sheet gasket extending about the metal annulus,
   (c) and bolt means clamping the head and case to the block creating compression loading transmitted by the metal sheet gasket and by the metal annulus, the non-metallic sheet gasket also clamped to seal off about said passages.

2. The combination of claim 1 wherein the metal annulus and non-metallic sheet gasket define a generally cylindrical interface therebetween, the metal annulus and non-metallic sheet gasket sized for use on a Harley Davidson motorcycle engine.

3. The combination of claim 2 wherein said metal annulus and non-metallic sheet are free of direct interconnection at said interface, the metal annulus including malleable metal in surface contact with at least one of the head and block.

4. The combination of claim 3 wherein said malleable metal consists essentially of copper.

5. The combination of claim 3 wherein said metal annulus has surface contact with both the head and block, at opposite sides of the metal annulus.

6. The combination of claim 4 wherein the entirety of the metal annulus consists essentially of copper.

7. The combination of claim 4 wherein the metal annulus includes a steel core, and copper at opposite sides of the core and engaging the head and block, the head and block consisting essentially of aluminum.

8. The combination of claim 1 wherein bolt means extend endwise through the block and into the head and case, whereby tightening of the bolt means clamps both the metal gasket and the metal annulus, conforming them to the block, and preventing destructive clamping of the non-metallic sheet.

9. The combination of claim 3 wherein the non-metallic sheet consists of a single layer of flexible, fire-resistant, homogeneous material.

10. The combination of claim 9 wherein said material consists of graphite

11. The combination of claim 3 wherein said non-metallic sheet consists of multiple layers of flexible, fire-resistant, homogeneous material.

12. The combination of claim 1 wherein said metal gasket consists of sandwiched layers of copper.

13. For use in combination with an internal combustion engine cylinder block, head and case, the block located between the head and case, there being passages in the block and head to pass fluid therebetween, outwardly of a cylinder bore, an improved sealing system comprising
   (a) a thin metal sheet gasket between the block and case,
   (b) a thin composite gasket between block and head,
   (c) bolt means clamping the head and case to the block creating compression loading transmitted by the metal sheet gasket and by the metal annulus, the non-metallic sheet gasket also clamped to seal off about said passages,
   (d) said composite gasket including a metal annulus extending about the cylinder bore and exposed to said bore, and a non-metallic sheet gasket extending about the metal annulus,
   (e) and wherein the metal annulus and non-metallic sheet gasket define a generally cylindrical interface therebetween, the metal annulus and non-metallic sheet gasket sized for use on a Harley Davidson motorcycle engine,
   (f) said metal annulus and non-metallic sheet are free of direct interconnection at said interface, the metal annulus including malleable metal surface contact with at least one of the head and block.

14. The combination of claim 13 wherein said malleable metal consists essentially of copper.

15. The combination of claim 14 wherein the entirety of the metal annulus consists essentially of copper.

16. The combination of claim 14 wherein the metal annulus includes a steel core, and copper at opposite sides of the core and engaging the head and block, the head and block consisting essentially of aluminum.

17. The combination of claim 13 wherein the non-metallic sheet consists of a single layer of flexible, fire-resistant, homogeneous material.

* * * * *